(12) United States Patent
Siddiqui et al.

(10) Patent No.: US 11,430,145 B2
(45) Date of Patent: Aug. 30, 2022

(54) IDENTIFICATION OF LOCAL MOTIONS IN POINT CLOUD DATA

(71) Applicant: Foresight AI, Inc., Los Gatos, CA (US)

(72) Inventors: Matheen Siddiqui, Long Beach, CA (US); Chang Yuan, Los Gatos, CA (US)

(73) Assignee: Foresight AI Inc., Los Gatos, CA (US)

( * ) Notice: Subject to any disclaimer, the term of this patent is extended or adjusted under 35 U.S.C. 154(b) by 725 days.

(21) Appl. No.: 16/428,195

(22) Filed: May 31, 2019

(65) Prior Publication Data
US 2019/0383941 A1 Dec. 19, 2019

Related U.S. Application Data

(60) Provisional application No. 62/686,049, filed on Jun. 17, 2018.

(51) Int. Cl.
| | | |
|---|---|---|
| *G06T 7/579* | (2017.01) | |
| *G01S 17/58* | (2006.01) | |
| *G06T 7/521* | (2017.01) | |
| *G06T 7/20* | (2017.01) | |
| *G01S 17/89* | (2020.01) | |

(52) U.S. Cl.
CPC ............ *G06T 7/579* (2017.01); *G01S 17/58* (2013.01); *G01S 17/89* (2013.01); *G06T 7/20* (2013.01); *G06T 7/521* (2017.01); *G06T 2207/10028* (2013.01); *G06T 2207/20081* (2013.01); *G06T 2207/30184* (2013.01)

(58) Field of Classification Search
CPC .......... G06T 7/579; G06T 7/20; G06T 7/521; G06T 2207/10028; G06T 2207/20081; G06T 2207/30184; G01S 17/58; G01S 17/89; G01S 7/4802
See application file for complete search history.

(56) References Cited

U.S. PATENT DOCUMENTS

| | | | |
|---|---|---|---|
| 9,729,789 | B2 | 8/2017 | Horak |
| 9,870,512 | B2 | 1/2018 | Rogan |
| 9,874,308 | B2 | 1/2018 | Saika et al. |
| 9,945,950 | B2 | 4/2018 | Newman et al. |
| 2016/0217611 | A1 | 7/2016 | Pylvaenaeinen et al. |
| 2017/0337425 | A1 | 11/2017 | Lee et al. |
| 2018/0060064 | A1 | 3/2018 | Liu et al. |
| 2018/0120441 | A1 | 5/2018 | Elooz et al. |
| 2019/0258899 | A1* | 8/2019 | Coogan ............... G06V 20/188 |

* cited by examiner

*Primary Examiner* — Nam D Pham
(74) *Attorney, Agent, or Firm* — Fenwick & West LLP

(57) ABSTRACT

Methods that identify local motions in point cloud data that are generated by one or more rounds of LIDAR scans are disclosed. The point cloud data describes an environment with points with each point having a scanned time and scanned coordinates. From the point cloud data, a subset of points is selected. A surface is reconstructed at a common reference time using the subset of points. The reconstructed surface includes points that are moved from the scanned coordinates of the points in the subset. The moved points are derived from a projected movement under a projected motion parameter in duration between the scanned time and the common reference time. The surface quality of the reconstructed surface is determined. If the surface has a high quality, the projected motion parameter is determined to be the final motion parameter that is used as an indication whether an object is moving.

18 Claims, 7 Drawing Sheets

IDENTIFICATION OF LOCAL MOTIONS IN POINT CLOUD DATA

CROSS REFERENCE TO RELATED APPLICATION

This application claims the benefit of U.S. Provisional Application No. 62/686,049, filed Jun. 17, 2018, which is incorporated by reference in its entirety.

BACKGROUND

This disclosure relates generally to reconstruction of a digital map. Specifically, this disclosure relates to identification of movements of objects in point cloud data.

Point cloud data can be generated using light detection and ranging (LIDAR) technology. While point cloud data may provide a precise contour of a scene, the data is often affected by noise present during LIDAR scans. In reconstructing a map from the point cloud data, a desired goal is to capture permanent objects (e.g. roads, signs, buildings, sidewalks) in an environment so that the reconstructed map represents accurate outlines of a location. However, point cloud data is sometimes degraded by points generated by temporary objects such as moving objects that are not the intended targets of the LIDAR scans. For example, a scan of a busy street in a city will inevitably include moving vehicles and walking pedestrians. The presence of temporary objects results in inconsistencies of point cloud data and deteriorates the quality of the reconstructed map. The scalability of methods of reconstructing maps using LIDAR scans is also often limited by the noise because the removal of the noise in point cloud data has been challenging and labor-intensive.

SUMMARY

This disclosure relates to identifying local motions of objects in point cloud data in constructing a map, such as a 3D map. Specifically, the map may be constructed from point cloud data of an environment. The point cloud data may be captured from LIDAR scans of the environment. The point cloud data describes the environment with points. Typically a LIDAR device emits a high-frequency laser at different directions to survey an environment. Hence, the points are often associated with different scanned time. In one embodiment, each point in the point cloud includes data describing the scanned time and scanned coordinates. In a collection of a large number of points scanned from an environment, removing transient objects could be challenging because each point was generated at a slightly different time. In one embodiment, a computing system selects a subset of points corresponding to an object for further analysis. For points corresponding to an object or part of an object, nearby points at boundary of the object are often associated with a sudden change in scan depth (e.g., an abrupt change in coordinate data). The computing system may select a group of points that have similar depths as a subset. To identify potential movement of the object, the subset of points corresponding to the object or a portion of the object is further analyzed through a surface reconstruction process. The surface reconstruction process takes into account of the differences in scanned time and projects an estimated movement parameter for the subset of points. Using the projected movement parameter, the computing system can move points based on different scanned time to reconstruct a simulated surface as if the points classified in the subset were scanned simultaneously. The computing system evaluates whether the projected movement is correct by examining the quality of the surface reconstructed. In turn, the computing system can identify relative motions among objects in the environment and remove transient objects that are not of interest in generating a map.

By way of example, surface reconstruction may be an iterative process that aims to determine a final motion parameter common to the subset of points by projecting different estimated motion parameters to attempt to reconstruct different surfaces. In a given iteration, a reconstructed surface is formed at a common reference time by moving the subset of points from the scanned coordinates at each respective scanned time to estimated coordinates at the common reference time. The new estimated coordinates of each of the moved points are derived from a projected motion parameter that represents a projected movement of the points in the duration between the scanned time and the common reference time. Since the coordinates are expected to be of the same object, the coordinates are expected to experience the same projected movement, although the points may have been captured at different times. By moving the points to locations at the common reference time, the points collectively form a reconstructed surface.

After the reconstructed surface is formed, its surface quality is evaluated to determine whether the estimated motion parameter, as applied to the scanned points, generates a surface consistent with a single object. The evaluation can be based on any suitable mathematical surface models. For example, the entropy of the surface can be determined. Alternatively or additionally, the thickness of the reconstructed surface can be determined. The quality of the reconstructed surface may not be guaranteed because the movements of the points are based on a projected motion parameter that is an estimate of the movement. The projected motion parameter may or may not accurately reflect the actual potential movement of the object associated with the subset of points when the LIDAR scans were performed. After the surface quality of the reconstructed surface is evaluated, a surface score is computed for the reconstructed surface. In response to the surface score exceeding a threshold, the projected motion parameter is determined to be the final motion parameter of the subset of points. A high surface score represents that the projected motion parameter correctly reflects the actual movement of the object with respect to the movement of the LIDAR system at the time of the scan. On the contrary, if the surface score fails to exceed the threshold, the poor surface quality indicates that the projected motion parameter does not sufficiently predict the actual potential movement of the object. In turn, a new projected motion parameter is proposed and another iteration to reconstruct a surface is performed by moving the points to the common reference time based on the new projected motion parameter. This process can be iteratively repeated until a reconstructed surface generated with a projected motion parameter is determined to have high surface quality. Whether an object is moving can be determined based on the final motion parameter.

Sets of points that have final motion parameters that indicate the objects that are associated with the sets of points are moving may be removed from the point cloud data. A map may be reconstructed using the point cloud data with the sets of points removed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
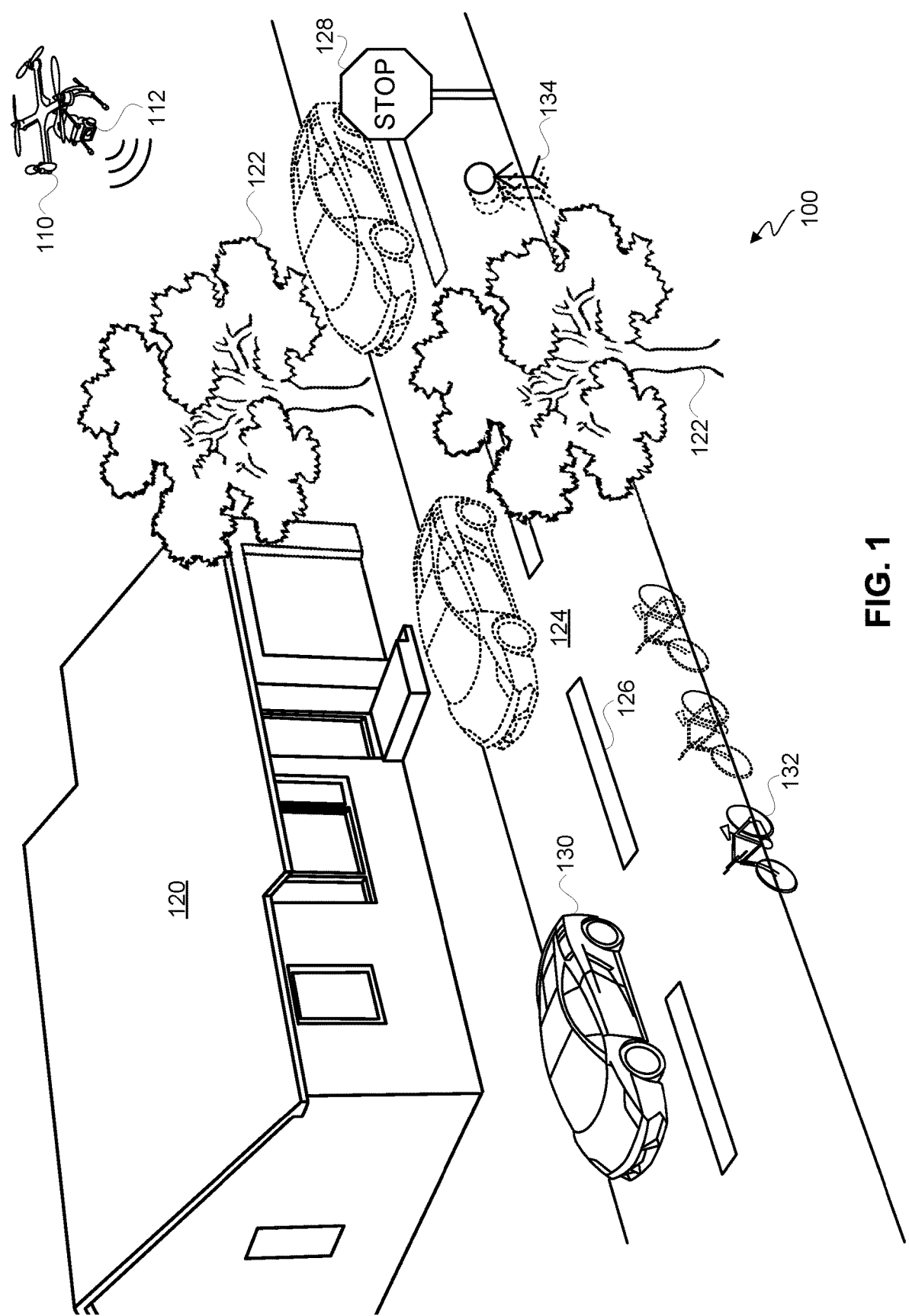
FIG. 1 is a diagram illustrating an exemplary scenario of a scanning process of a scene surveyed by a drone.

FIG. 1 is a diagram illustrating an exemplary scenario of a scanning process of a scene 100 by a drone 110. A scene is a place to be scanned. Depending on the location, the environment of a scene may include various stationary objects and moving objects. For example, the environment of the scene 100 in FIG. 1 includes stationary objects such as a house 120, trees 122, a street 124, a series of street dividers 126, and a road sign 128. The scene 100 (also includes moving objects such as a moving car 130, a traveling bicycle 132, and a walking pedestrian 134. Some of the objects in the environment may be classified as landmarks. A landmark described here is an object or a feature of an environment that is easily identifiable based on a database of images of different common objects. For example, in the scene 100, the road sign 128, which can be a common stop sign, may be determined to be a landmark. The house 120 may also be determined to be a landmark, depending on the design of the house and how readily the house is identifiable by a computer.

The drone 110 is equipped with one or more scanning devices 112 that capture images and/or data relating to the scene 100 around and below the drone 110. The drone 110 may be equipped with more than one types of scanning devices 112. Examples of scanning devices include LIDAR devices, cameras, and the like. In one embodiment, the drone 110 carries one or more LIDAR devices that detect and record emitted lasers reflected by various objects. Based on the reflection, the LIDAR devices generate preliminary data such as distance and time of various points in the scene based on the reflections. The preliminary data may be processed by the LIDAR devices or offsite to generate point cloud data of an environment. The point cloud data describes the environment with points that may account for the objects in the scene. Each point includes a scanned time and scanned coordinates associated with the point.

The drone 110 may also carry a camera that captures colored images of the objects in the environment. The camera may be synchronized with the LIDAR devices spatially and/or temporally so that the points in the photo cloud data obtained from the LIDAR devices may also be associated with a color value.

While FIG. 1 illustrates that the scanning devices 112 are carried by a drone 110 to perform aerial scanning of the scene 100, it should be understood that various scanning devices 112 may also be carried by other types of vehicles, such as a land vehicle, to perform a survey of the environment of a scene.

The drone 110 travels to different locations to perform surveys of different environments. When the drone 110 arrives a scene, such as the scene 100, the drone 110 may hover in a relatively stationary manner to perform extensive scans of the scene 100. The scanning process may include repeated scans of the scene 100 at different time. For example, to capture the variations of the scene 110, one or more rounds of LIDAR scans are performed in different time frames to capture the change in locations of the moving objects. In FIG. 1, the dashed-lined copies of the car 130, the bicycle 132, and the pedestrian 134 represent the locations of the moving objects at different times. The dashed-lined copies of the car 130 are separated more apart than those of the bicycle 132 and pedestrian 134 because the car 130 travels at a higher velocity than the bicycle 132 and the pedestrian 134.

Figure 2:
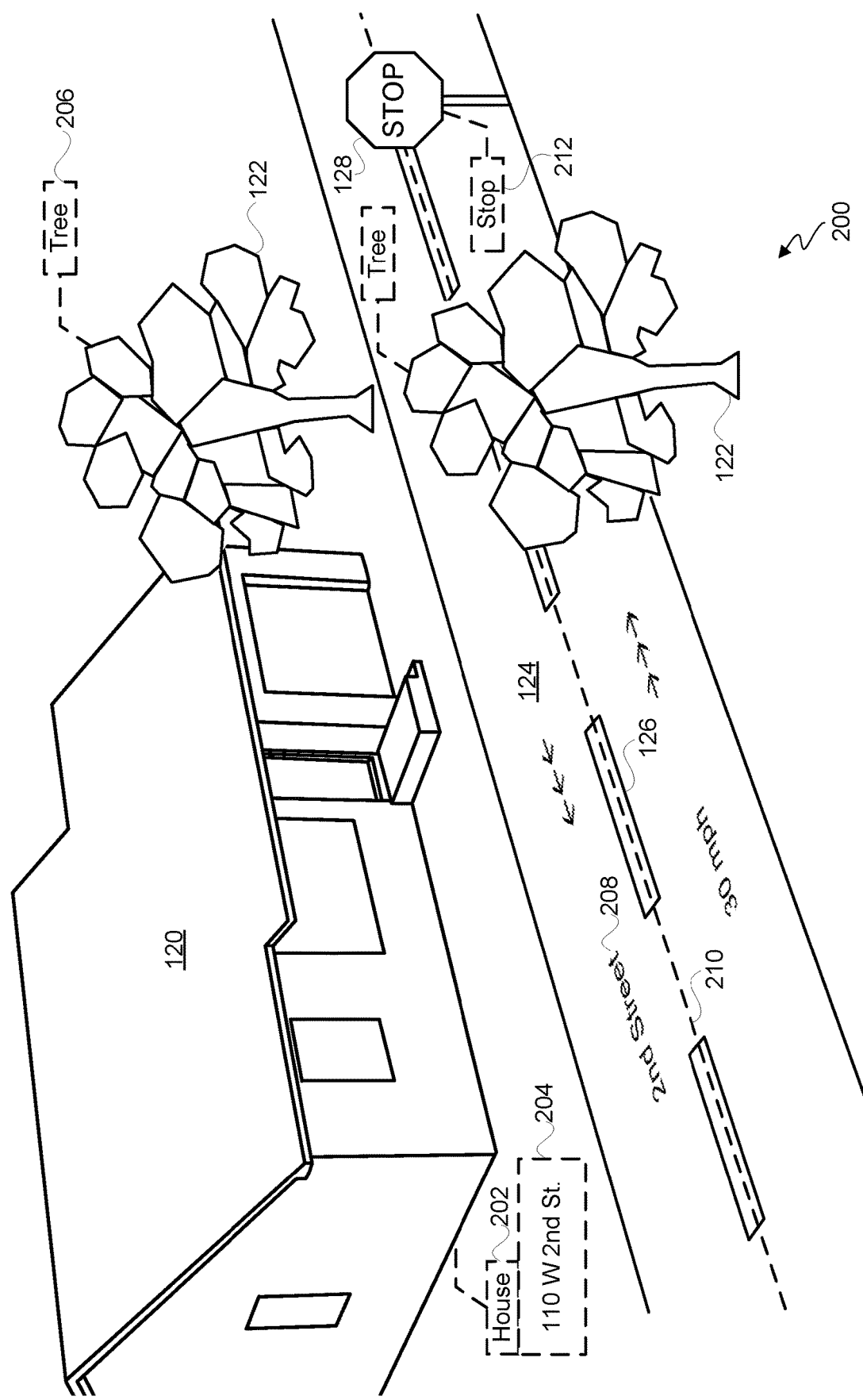
FIG. 2 is a diagram illustrating an exemplary result of a three-dimensional model reconstructed from the scanning process illustrated in FIG. 1, in accordance with an embodiment.

FIG. 2 is a diagram illustrating an exemplary result of a map 200, such as a three-dimensional (3D) map, reconstructed from the scanning data of the scanning devices 112. The point cloud data obtained from LIDAR scans are processed and associated with different surfaces and objects. Different 3D polygons are formed by joining points of the point cloud data to create 3D surface elements. Each object, for example, the house 120, the trees 122, the road sign 128, is represented by a combination of multiple 3D polygons that represent different portions and parts of the objects (the polygons are best shown in the tree 122). The 3D polygons are in sizes proportional to each other. In one embodiment, the 3D polygons in the map 200 can be in a precision range of centimeters. Each of the points in a 3D polygon can also be associated with a different color value. In this example, data associated with the moving objects shown in FIG. 1 such as the car 130, the bicycle 132, and the pedestrian 134 are removed so that those objects are not present in the map 200. The identification and removal of the moving object in the point cloud data will be discussed in further detail below. To identify moving objects and account for the movement of the LIDAR system itself, motion parameters of objects may be estimated and used, for example, to identify and remove moving objects from the map of the scene.

In addition to the map geometry that can be stored in a map layer, the map 200 may include additional layers that include metadata annotating the map geometry. Each annotation may be associated with a single or a group of 3D polygons. For example, the house 120 may be labeled with an object identifier 202 "house" and a full address 204. The trees 122 may be labeled with an object identifier 206 "tree." In addition, there may be other map layers that are associated with traffic and road information. The street 124 may be labeled with a street name 208 and marked with street divider data 210 that signifies the number of lanes of a street. Traffic regulatory information such as stops (label 212 at the road sign 128), yields, speed limits, lane turn restrictions, route paintings, curbs, sidewalks, etc. may also be stored in one or more map layers.

Figure 3:
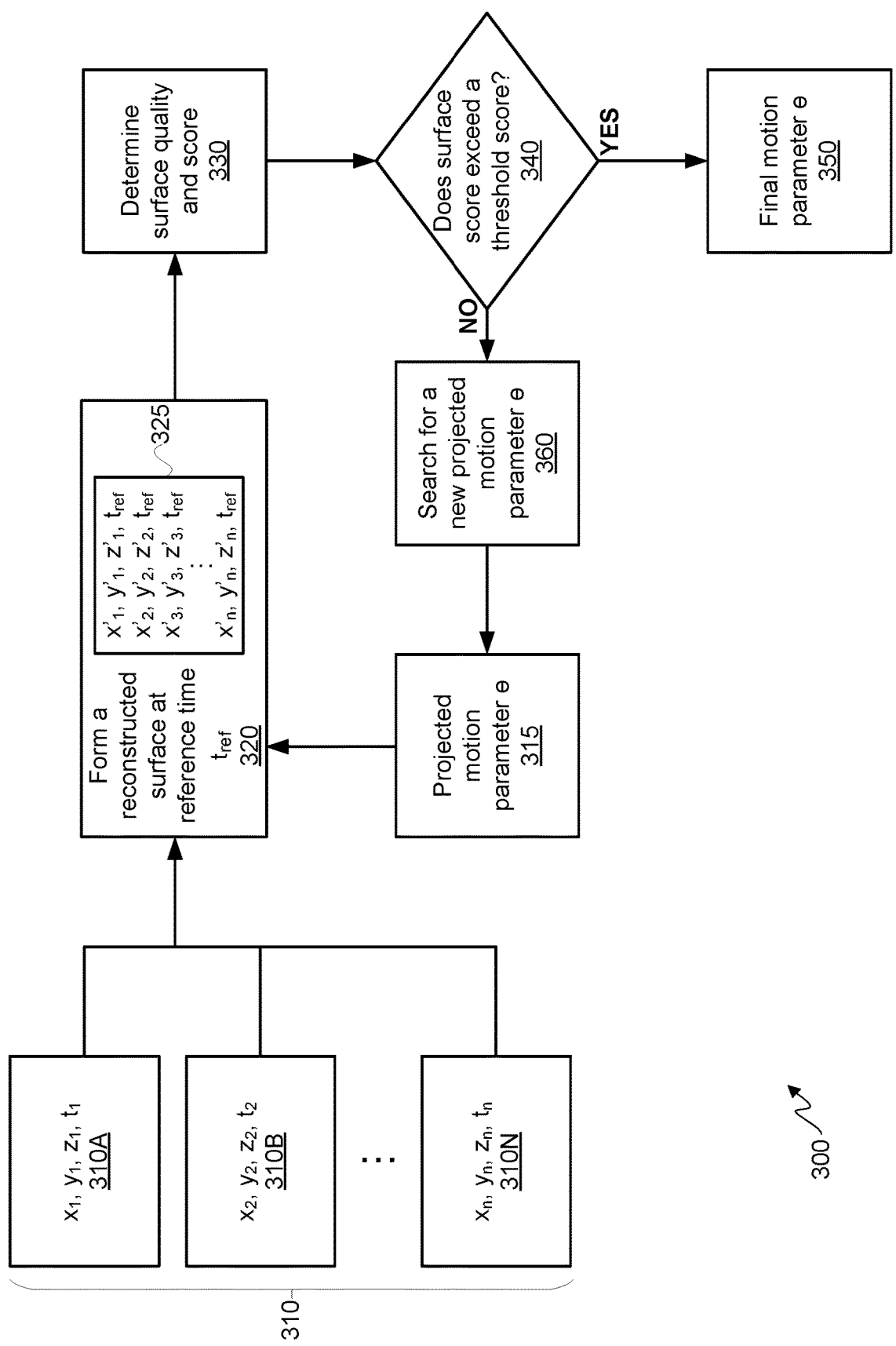
FIG. 3 is a block diagram illustrating an exemplary process that determines a motion parameter of an object present in point cloud data, in accordance with an embodiment.

FIG. 3 is a block diagram illustrating an exemplary process 300 of determining a motion parameter of an object based on point cloud data. The process 300 repeatedly projects different motion parameters to reconstruct different surfaces until the surface quality of one of the reconstructed surfaces is satisfactory. When a high-quality surface is able to be constructed, the projected motion parameter reflects a close estimate of the actual movement of an object represented by a volume of points in the point cloud. Hence, a computing system can determine the motion parameter that reflects whether the object moved when the LIDAR scans were performed As part of preliminary preparation, point cloud data is obtained from a LIDAR sensor, such as scanner 112. The LIDAR sensor may capture the data with respect to rotation and distance, which may be converted to points with coordinate data to form a point cloud. The coordinates may be represented in a Cartesian coordinate system with each point have an x value, a y value, and a z value. The coordinates may also be represented in any other suitable coordinate systems. Each point is also associated with a timestamp that represents the scanned time of the point.

The process 300 may begin with point cloud data of an environment after preliminary data from the LIDAR scan is converted to the point cloud data. From the point cloud data, a subset of points 310 associated with an object in the environment is identified. The classification of whether a data point belongs to the subset associated with the object may be based on the distance data of the points that allow edges in the point cloud to be identified. For example, edges are identified when an abrupt change in depth (e.g. large change in distance data) is detected in neighboring points. Such an abrupt change in depth may signify that those neighboring points are associated with two different objects. After edges are identified, multiple objects or surfaces of the objects in a point cloud can be identified.

The subset of points 310 may be associated with an object or a surface of an object at different scanned times. For example, the subset of points 310 may be associated with multiple rounds of scans of the same object or may capture the object at different moments within a single scan round. The time differences among the points in the subset 310 may vary. For points that belong to the same round of scan, points might have slight variations in the values of the scanned time due to the duration required to complete sweepings and rotations of the laser(s) within the LIDAR device. For points that belong to different rounds of scans, points might have relatively large differences in terms of the values of the scanned time.

A reconstructed surface 325 is formed 320 at a common reference time, $t_{ref}$. In the process 300, each point in the subset 310 includes scanned coordinates and a scanned time. For example, a first point 310A in the subset 310 includes scanned coordinates of $x_1$, $y_1$, and $z_1$ and a scanned time $t_1$. Likewise, a second point 310B in the subset 310 includes scanned coordinates of $x_2$, $y_2$, and $z_2$ and a scanned time $t_2$, etc. The reconstructed surface 325 is formed by moving the scanned coordinates of the points to coordinates at the common reference time based on a projected motion parameter $\theta$ 315. The common reference time can be any chosen time, such as the earliest time associated with the subset 310 of points. One example of a projected motion parameter $\theta$ 315 is a vector that includes a speed and a direction of travel. Other types of motion parameters are also possible. Initially, the projected motion parameter $\theta$ 315 may be based on a rough estimate, a fixed value, or an arbitrary pick. After the projected motion parameter $\theta$ 315 is set, the points in the subset 310 are moved to the projected locations at the common reference time. The moved coordinates are derived from a projected movement based on the projected motion parameter $\theta$ 315 for duration between the scanned time specific to the point and the common reference time. For example, $t_1$ of the first point 310A may occur at two units of time after a chosen common reference time. By multiplying the projected motion parameter $\theta$ 315 by negative ($t_1$ occurred later) two units of time, the scanned coordinates $x_1$, $y_1$, and $z_1$ are mapped to moved coordinates $x'_1$, $y'_1$, and $z'_1$ at the common reference time. Similarly, the scanned coordinates of the second point 310B and other points such as the n-th point 310N are mapped to the moved coordinates based on the differences between the scanned time associated with each point and the common reference time.

To estimate whether the projected motion parameter $\theta$ 315 effectively describes the object's motion, the points, as adjusted by the motion parameter, are modeled as a surface. To evaluate the surface, a surface quality score is determined 330 for the surface. The surface quality of the reconstructed surface 325 is evaluated. The surface quality can be quantified to a score based on various mathematical models and calculation. For example, in one embodiment, entropy, which correlates to the randomness of a set of data, of the reconstructed surface 325 can be used as the surface quality score or a part of the score. In another embodiment, the thickness of the reconstructed surface 325 can be determined. The thickness can be evaluated based on various statistical measures such as mean, maximum, and/or variances. The thicker the reconstructed surface 325, the lower is the score, and vice versa. Other suitable mathematical models may also be used to quantify the surface quality of the reconstructed surface 325. In one embodiment, a combination of different models such as entropy and surface thickness is used to compute a surface quality score.

The computed surface quality score is compared 340 to a threshold score to determine whether the surface quality score exceeds the threshold score. The surface quality score exceeding the threshold score indicates that the surface quality of the reconstructed surface 325 is satisfactory. In other words, a high-quality surface signifies that the projected motion parameter $\theta$ 315 provides a close estimate of the actual movement of the object when the scans were performed. Responsive to the surface quality score exceeding the threshold score, the projected motion parameter $\theta$ 315 is determined as the final motion parameter $\theta$ 350. Responsive to the surface quality score being below the threshold score, the process 300 enters an iteration process and searches 360 for a new projected motion parameter $\theta$.

A threshold score may be determined based on the expected noise of the LIDAR sensor that performed the scan. A LIDAR sensor may report data regarding its system's inherent errors or imprecision, such as the system's depth errors. For example, typical depth errors can be in an order of 2-3 centimeters. If the determination of the surface quality is based on a surface thickness model, the threshold score may be set in accordance with the reported depth errors (e.g., a scored that is converted directly from the upper bound of the reported depth errors or from a range that is similar to the reported depth errors). As a result, if a surface thickness of a reconstructed surface 325 is below the threshold, the slight variations in thickness would likely come from merely the errors in the LIDAR sensor. In such a case, the projected motion parameter $\theta$ 315 that is used to reconstruct the surface 325 can be regarded as a close estimate of the actual movement of the object. In the case when entropy is used to model the surface quality, a computer can carry out a simulation based on an ideal surface. In the simulation, the computer can corrupt the ideal surface by LIDAR sensor's noise and compute the entropy of the surface with noise. The computer may then determine the threshold score in accordance with the entropy of the simulation (e.g., a score that is converted directly from the simulated entropy value or a score that tolerates slightly more randomness than the simulated entropy). The threshold score may also be based on a combination of different models.

If the surface quality score of a reconstructed surface 325 is below the threshold value, a new projected motion parameter θ is identified via a search 360. The search for new projected motion parameter θ 315 may be based on the surface quality scores and motion parameters θ 315 of previous iterations. For example, the iteration process may determine whether an increase in motion parameters θ 315 resulted in a better or worse surface quality score to propose a new motion parameter θ 315. After the new motion parameter θ 315 is proposed, the process 300 generates a new reconstructed surface 325 by computing new moved coordinates of each point at the common reference time. The surface quality score of the new reconstructed surface 325 is then evaluated a final motion parameter θ 350 exceeds the threshold quality score (or is the highest quality score determined from the evaluated motion parameters θ 315). Alternatively, the evaluation process 300 may also be terminated after a certain number of evaluated motion parameters or after all possible reasonable values of motion parameters are exhausted. A failure in determining a final motion parameter may indicate that the subset of points 310 does not belong to the same object or to a surface of the object. A different subset of points may then be recollected for the iteration process.

Figure 4A:
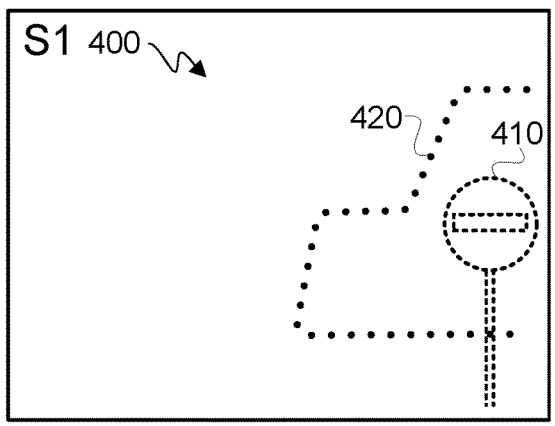
FIGS. 4A-4C illustrates a process of surface reconstruction and surface quality determination, in accordance with an embodiment.
Figure 4A:
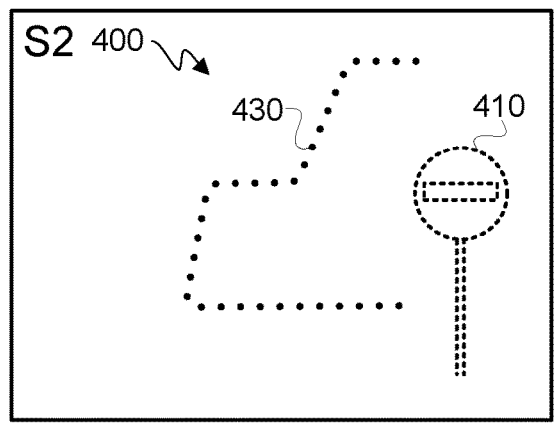
Figure 4A:
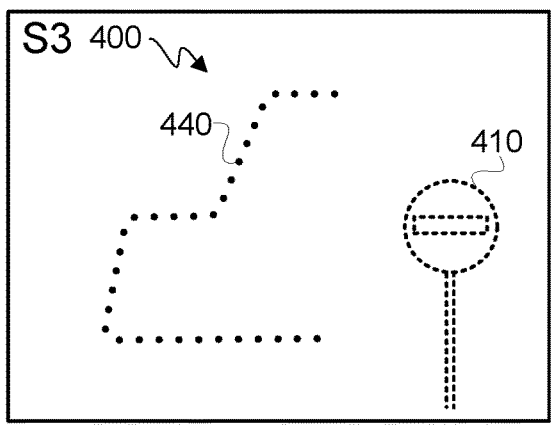
Figure 4A:
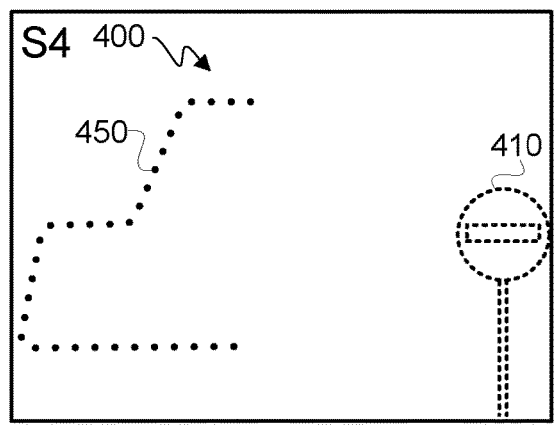
Figure 4B:
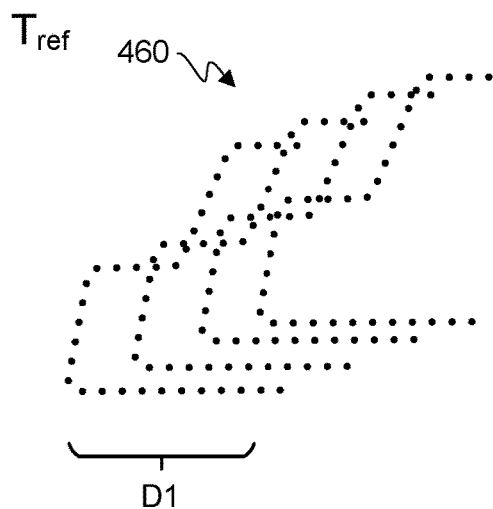
Figure 4C:
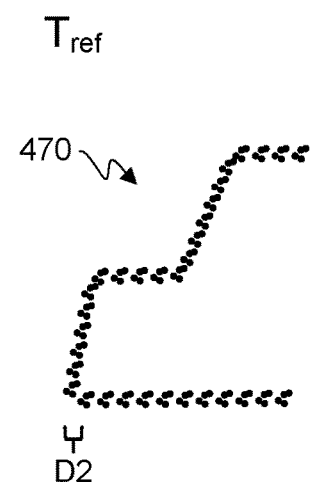

FIGS. 4A-4C illustrate in further detail the surface reconstruction and the surface quality score determination process, in accordance with an embodiment. FIG. 4A illustrates simplified point cloud data 400 of a simplified scene at different rounds of scans S1, S2, S3, and S4. Each round of scan represents a time period in which a scanning device such as a LIDAR device completes a round of sweeping and/or rotation. The simplified scene includes a road sign, which is a stationary object, and a moving object such as a car. The point cloud data 400 includes points of a first round of scan S1 that generates a group of points 410 associated with the road sign and a group of points 420 associated with a portion of the moving object. Each point within the same group might have a slightly different timestamp because of the sweeping and rotation performed by the scanning device. The point cloud data 400 also includes points of a second round of scan S2 that generates a group of points 410 associated with the road sign and a group of points 430 associated with the portion of the moving object. Similarly, the point cloud data 400 also includes a group of points 440 and 450 associated with the portion of the moving object respectively generated at the third and fourth rounds of scans S3 and S4. The scanned coordinates across time of the points 420, 430, 440, and 450 change significantly because the object is moving between different rounds of scans. It should also be noted in some cases the coordinates of the points 410 associated with the stationary road sign may also change slightly from round to round of scans (as shown in the slight change in location of the road sign in FIG. 4A) due to the movement of the LIDAR device (e.g., due to movement of the drone on which the LIDAR is positioned). In other words, the drone that carries the scanning devices hovering in the air may have moved slightly during the scanning process.

The groups of points 420, 430, 440, and 450 from the point cloud data 400 can be identified as a subset of points 310 used in the process 300 described in FIG. 3. One or more reconstructed surfaces 325 can be formed using the groups of points 420, 430, 440, and 450 based on different projected motion parameter θ 315. For example, FIGS. 4B and 4C are examples of reconstructed surfaces based on different projected motion parameter θ 315 at a common reference time, $T_{ref}$. At the common reference time, a reconstructed surface includes moved points. Each of the moved points is associated with moved coordinates of the scanned coordinates of the subset of points 310. The moved coordinates are derived from a projected movement under the projected motion parameter θ 315 in duration between the scanned time and the common reference time. The reconstructed surface 460 shown in FIG. 4B illustrates a surface with a low surface quality score, while the reconstructed surface 470 shown in FIG. 4C illustrates a surface with a high surface quality score. The reconstructed surface 460 is associated with a thickness D1 that is significantly thicker than the thickness D2 of the reconstructed surface 470. As such, a low surface quality score is assigned to the reconstructed surface 460. This signifies that the projected motion parameter θ 315 used to reconstruct the surface 460 fails to provide a close estimate of the actual movement of the moving object from S1 to S4. In such a case, a new projected motion parameter θ 315 should be searched in order to reconstruct a high-quality surface. On the other hand, a high surface quality score is assigned to the reconstructed surface 470 and the projected motion parameter θ 315 associated with the reconstructed surface 470 may be kept as the final motion parameter.

Figure 5A:
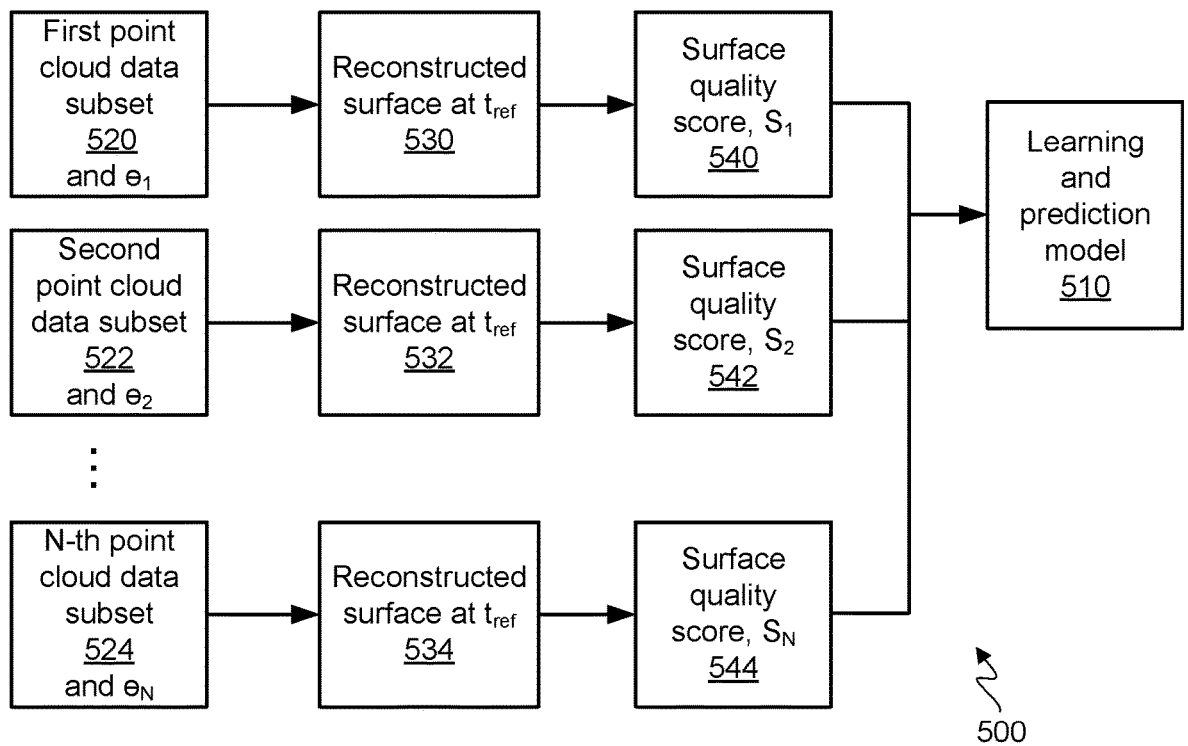
FIG. 5A is a block diagram illustrating a training process of a learning and prediction model, in accordance with an embodiment.

FIG. 5A is a block diagram illustrating a training process 500 of a learning and prediction model 510, in accordance with an embodiment. Machine learning techniques may be used to generate a learning and prediction model 510, which, after training, outputs a predicted motion parameter θ when a subset of points with scanned coordinates and scanned times are input. The output of the learning and prediction model 510 may be used as an initial projected motion parameter θ 315 in the process 300 described in FIG. 3 for the start of an iteration process. After the learning and prediction model 510 is sufficiently trained, the output of the model 510 may also be directly used as the final motion parameter θ.

The training process may start with a plurality of subsets of point cloud data 520, 522, 524, etc. and a corresponding predetermined motion parameter θ for each subset of point cloud data. Each subset of points 520, 522, or 524 includes a plurality of points with scanned coordinates and scanned time. For each subset of points 520, 522, or 524, a reconstructed surface 530, 532, or 534 is formed at a common reference time based on the predetermined motion parameter θ associated with each of the subsets. Surface quality scores 540, 542, or 544 are determined. All those sets of data and values are provided to the learning and prediction model 510 to search for one or more regression parameters that optimize the surface quality scores $S_1, S_2, \ldots, S_N$.

The learning and prediction model 510 may further be trained using a positive training group and a negative training group. The positive training group includes multiple subsets of points with each subset associated with a known motion parameter θ that will result in a reconstruction of a surface with a high surface quality score. The negative training group includes multiple subsets of points with each subset associated with a known motion parameter θ that will result in a reconstruction of a surface with a low surface quality score. By providing both the positive and the negative groups to the learning and prediction model 510, a loss function can be used to minimize the error in estimating a final motion parameter that will result in a high surface quality. Training may be performed by adjusting weights in the learning and prediction model 510 to reduce error in predicting the motion parameters using the model 510 when compared to the actual motion parameters that are included in the training data. In an embodiment, an additional training group that includes multiple subsets of points, with each subset having points that do not belong to the same object, may be provided to the learning and prediction model 510 so that the model 510 may recognize subsets of points that are able to be reconstructed. In some cases, the learning and prediction model 510 may also include an algorithm that performs the iteration process described in FIG. 3 to further refine the determination of an optimal motion parameter θ.

Figure 5B:
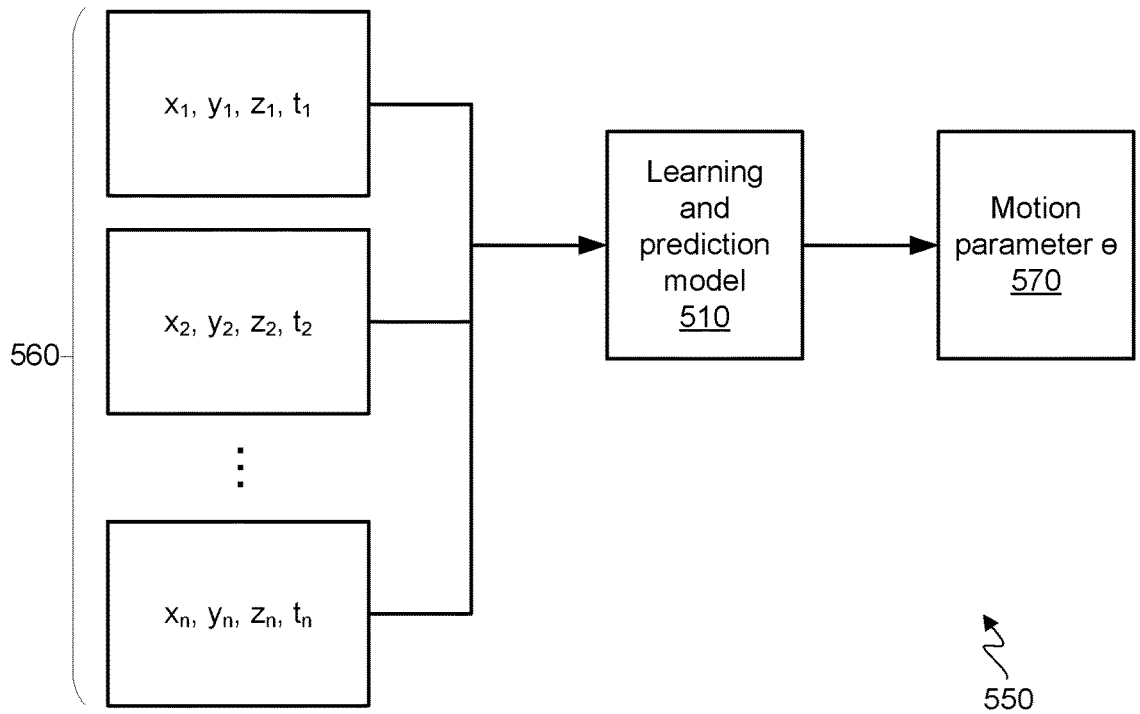
FIG. 5B is a block diagram illustrating a motion parameter determination process using the learning and prediction model shown in FIG. 5A, in accordance with an embodiment.

FIG. 5B is a block diagram illustrating a motion parameter determination process 550 using a trained learning and prediction model 510, in accordance with an embodiment. After the learning and prediction model 510 is trained based on the process 500 described in FIG. 5A, the learning and prediction model 510 can be used to determine a motion parameter 570 of a given subset of points 560. The subset of points 560 may be obtained from point cloud data of new scans of a scene. The subset of points 560 are input to the learning and prediction model 510. A motion parameter θ 570, which may result in a reconstruction of a surface with a high surface quality score, can be determined by the learning and prediction model 510. The motion parameter θ 570 is used to determine whether the object associated with the subset of points 560 was moving during the scanning process.

Figure 6:
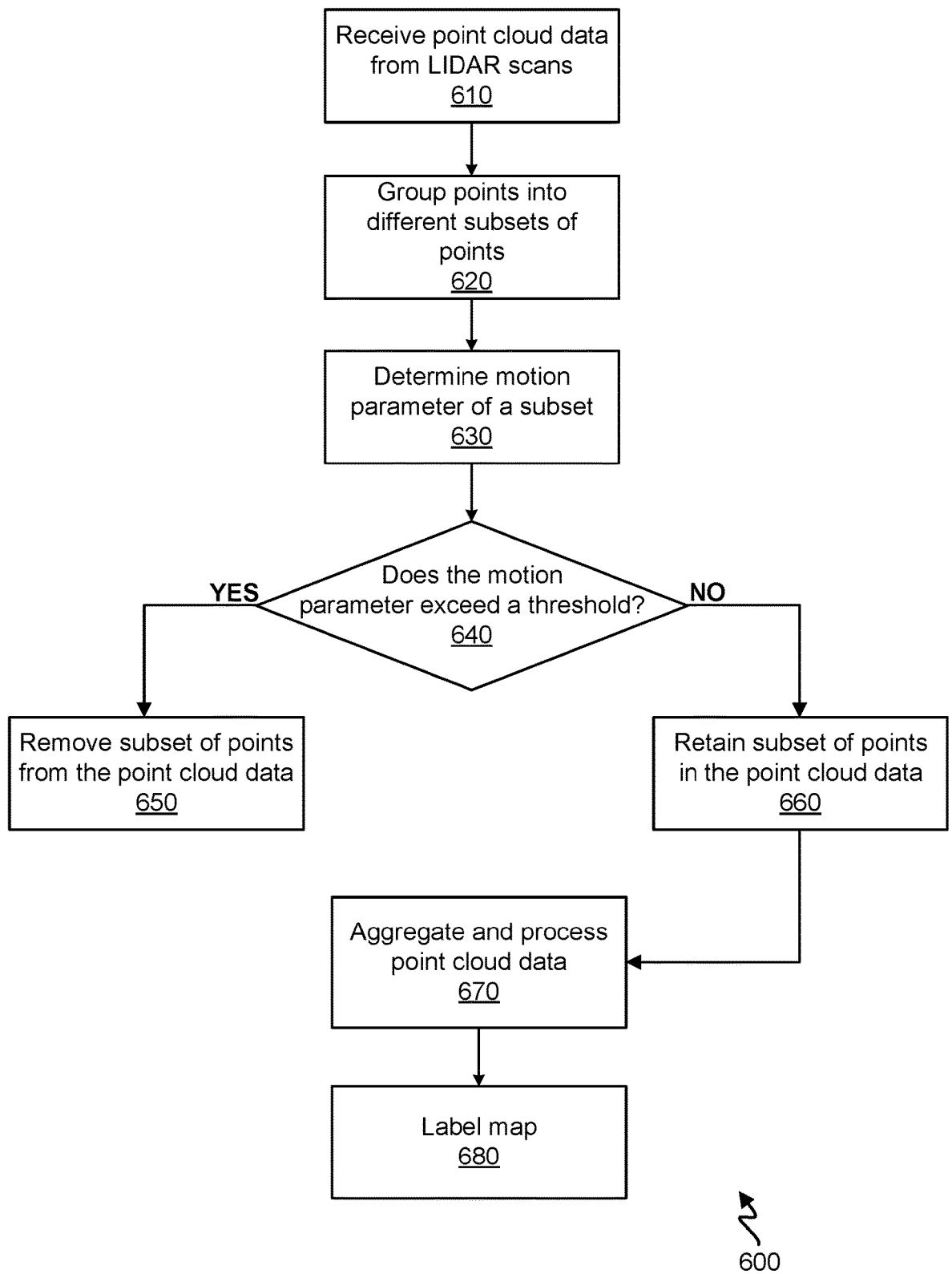
FIG. 6 is a flowchart depicting a process in constructing a map, in accordance with an embodiment.

FIG. 6 is a flowchart depicting a process 600 in constructing a 3D map, in accordance with an embodiment. A computing system receives 610 point cloud data from LIDAR scans. The point cloud data includes a plurality of points with each point having at least a scanned time and scanned coordinates. The computing system groups 620 the points in the point cloud data into different subsets of points. The grouping of points can be based on analyzing the edges of the points to identify different object surfaces. In one embodiment, the points of each surface identified in the point cloud data are grouped into an individual subset. In another embodiment, the points of several surfaces that are commonly associated with an object are grouped into a subset. After the computing system divides the point cloud data into different subsets, each subset may undergo the process described in 630 to 660 in order to identify whether an object associated with a subset was moving during the scanning process.

A computing systems determines 630 a motion parameter of a subset. In one embodiment, the motion parameter may be the velocity of the surface of the object associated with the subset determined by one or more processes described in FIGS. 3-5. The computing system compares 640 the motion parameter to a threshold value such as a threshold velocity. The threshold value may be a predetermined value or may be a value that is based on the relative determined motion parameters of other subsets in the point cloud data. A drone carrying the scanning devices may move slightly during one or more rounds of scans. Because of the drone's self-movement, motion parameters of stationary objects in the environment may have non-zero values that indicate the stationary objects are "moving." The motion parameters of the subsets of points associated with the stationary objects may be used to compensate or adjust the motion parameters of other subsets. For example, the threshold value is also based on the motion parameters of stationary objects.

Responsive to the motion parameter exceeding the threshold value, the object associated with the subset of points is determined to be a moving object, which is unlikely to be an object of interest in building a 3D map. As such, the computing system removes 650 the subset of points from the point cloud. Responsive to the motion parameter being below the threshold value, the computing system determines the object associated with the subset of points to be stationary. The computing system retains 660 the subset of points in the point cloud data. The process described in 630 to 660 can then be repeated for other subsets of points in the point cloud data.

After various subsets of points associated with moving objects are removed from the point cloud data, the computing system aggregates 670 the remaining point cloud data. The aggregation of point cloud data may include aligning and superimposing different portions of the point cloud data that belong to one or more rounds of scans. The process may also include removing residual or insignificant subsets of points that might be associated with small objects. The point cloud data may also be processed by associating each point with a color value. The point cloud data are then converted to different 3D polygons that represent objects and surfaces in the map. Post-processing of the map may be also carried out. For example, additional layers may be added to the map. The computing system labels various elements in the map metadata that may be stored in the additional layers.

The technique of determining the motion parameters of different objects in LIDAR scans has wider applications besides removing moving objects in constructing a 3D map. For example, small movements of the objects, such as the movement of leaves in trees, can be identified. Such movements are helpful in assisting the automatic labeling of objects. The technique can also be used to identify traffic flow information such as vehicle velocities. The technique can also be used in classifying the types of moving objects captured in LIDAR scans based on the velocities of the objects.

Figure 7:
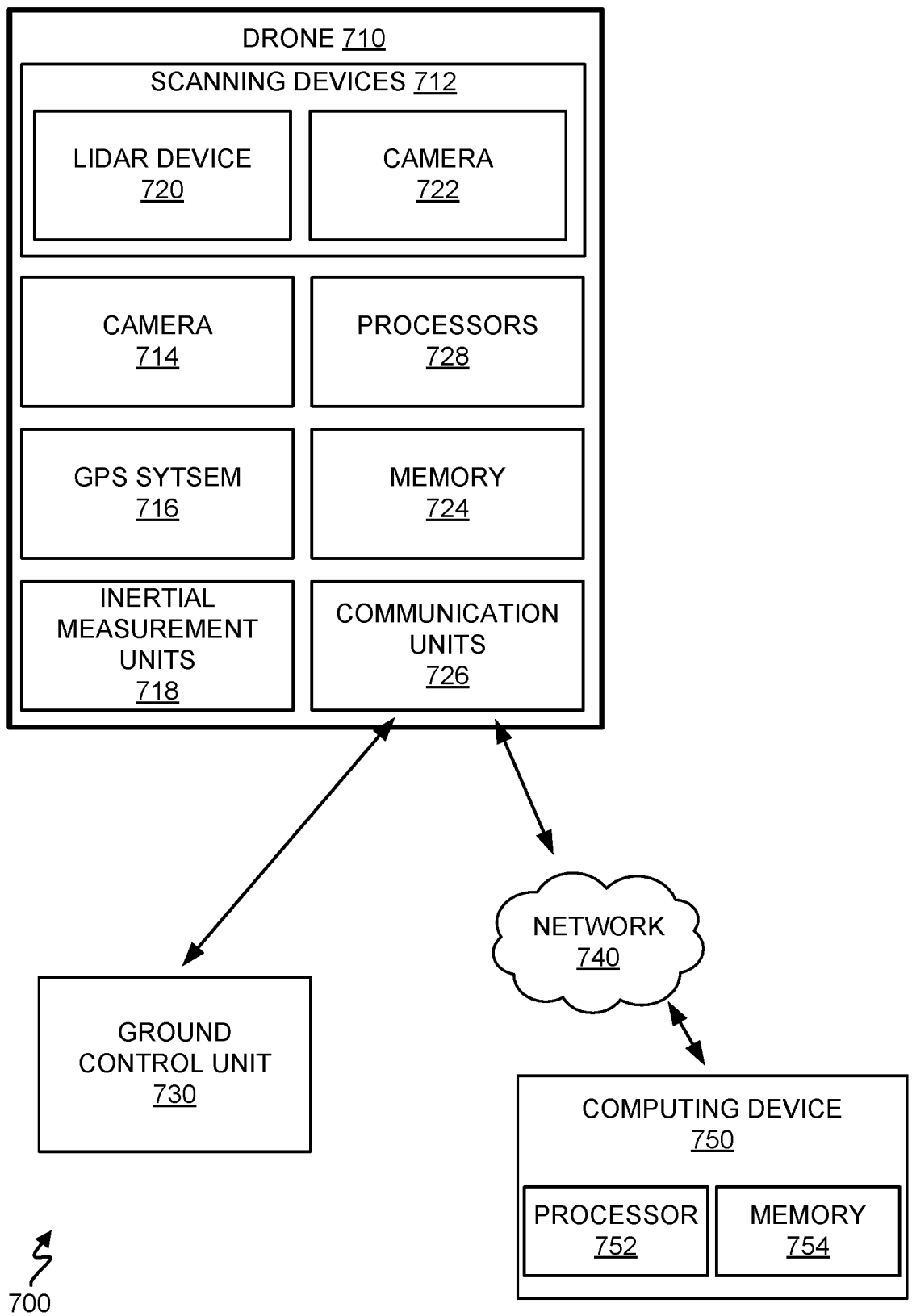
FIG. 7 is a block diagram illustrating an exemplary surveying system, in accordance with an embodiment.

FIG. 7 is a block diagram illustrating an exemplary surveying system 700, in accordance with an embodiment. The system 700 includes one or more devices configured to implement one or more embodiments described herein. The system 700 includes a drone 710 that may be controlled by a ground control unit 730 (a ground cockpit). The system 700 also includes a computing device 750 that receives and processes data obtained from the drone 710 through the network 740. The computing device 750 includes one or more processors 752 and memory 754. Depending on the exact configuration and type of computing device, memory 754 may be volatile (e.g. RAM), non-volatile (such as ROM), or some combination of the two. The non-volatile memory may take the form of a non-transitory computer readable storage medium that is configured to store program code. The program code includes instructions that, when executed by one or more processors, cause the processors to perform certain processes and operations, in accordance with some embodiments described herein.

The drone 710 may include scanning devices 712, a camera 714, a global position system (GPS) 716, inertial measurement units (IMU) 718, memory 724, communication units 726, and one or more processors 728.

The scanning devices 712 are survey devices carried by the drone 710 used to survey the scene. The scanning devices include one or more survey devices such as a LIDAR device 720, a camera 722, and/or the like. The scanning devices 712 also include mechanical units that allow translations, rotations, and other movements of the LIDAR device 720 and camera 722. In one embodiment, a drone 710 may only be equipped with one of the LIDAR device 720 or the camera 722.

The LIDAR device 720 that uses ultraviolet, visible, or infrared lasers to detect and record reflections of the lasers from various objects. The LIDAR device 720 includes one or more laser sources such as laser diodes that emit brief pulses of lasers hundreds of thousands of times a second. The LIDAR device 720 may include a single laser source or multiple laser sources that are arranged in a specific spatial relationship with each other to cover a range of angle. For example, multiple lasers may be emitted on a single plane and may point in general to the same direction but at different pitch angles. The LIDAR device 720 includes photoreceptors that sense the reflection of those pulses of lasers emitted. The LIDAR device 720 also includes a rotational unit that rotates a certain number of revolutions per second to direct the pulsed lasers to point at a certain range of angles. In one case, the rotational unit rotates a full circle. The rotational unit may also rotate up and down to change the polar angle of emission of the pulsed lasers. A round of scanning of a scene by the LIDAR device 720 may be associated with the rotational cycle of the LIDAR devices 720. Since the lasers are emitted in pulses at a high frequency, each detection of a point based on reflection may vary slightly in time.

Based on the timing between the emission of a pulsed laser and the return of the reflected laser, a distance can be determined. The LIDAR device 720 records preliminary data such as the distance data, the direction and angle data of the laser emission, and time data of the emission and/or detection of the reflection. The preliminary data may be processed by the processor 728 of the drone 710 or may be processed offsite by computing device 750 to generate point cloud data of an environment. The point cloud data describes the environment with points. Each point includes a scanned time and scanned coordinates associated with the point.

The camera 722 of the scanning devices 712 may be a dedicated camera for surveying the environment. The cameras 722 may be synchronized with the LIDAR device 720 spatially and/or temporally. For example, the camera 722 and the LIDAR device 720 may be mounted on the same rotational unit and may point to the same direction. The synchronization allows data generated from the camera 722 and data generated by the LIDAR devices 720 to be compared and combined. As such, the points in the point cloud data obtained from the LIDAR devices 720 may each be associated with a color value.

The camera 714 provides real-time images to the ground control unit 730 to allow a controlling person or device of the ground control unit 730 to navigate through the environment of the drone 710. The camera 714 may be a different camera than the camera 722 of the scanning devices 712.

The GPS 716 provides the global location of the drone 710 on a map. The GPS 716 may allow pre-programmed routes that enable the drone 710 to fly in predetermined routes autonomously. The IMU 718 includes accelerometers and gyroscopes. The IMU 718 measures forces, acceleration, and angular rotation of the drone 710. The IMU 718 detects the rate of acceleration and linear movement of the drone 710 using the accelerometers. The IMU 718 detects changes in the rotation of the drone 710 using the gyroscopes. The gyroscope also provides stabilization to ensure smooth flight of the drone 710. The GPS 716 and IMU 718 may work together to ensure the drone 710 remains in a relatively stationary manner during extensive scanning of a scene. For example, the GPS 716 may be used to determine the coarse location of the drone 710 while the IMU 718 may be used to determine the movement of the drone 710. The IMU 718 may provide data in the form of acceleration data. Such acceleration data may be processed such as by integration with respect to time to determine the velocity and by further integration to determine the position of the drone 710.

The memory 724 includes one or more storage units that may be volatile, non-volatile, or some combination of the two. The memory 724 stores the firmware and/or operating system of the drone 710. The memory 724 may be in the form of a non-transitory computer readable storage medium that is configured to store program code. The program code includes instructions that, when executed by one or more processors 728, cause the processors 728 to perform certain processes and operations. The memory 724 also includes a storage unit that is used to store data and images captured by the scanning devices 712. In one case, the processors 728 may process preliminary data captured and convert the data into point cloud data. In another case, raw data captured by the drone 710 may be sent to the computer device 750 via the communication units 726 and the network 740. The data, whether processed or not, may be stored in memory 724. Such data can be downloaded from the drone 710 when the drone 710 is landed and/or can be transmitted wirelessly to the network 740.

The communication units 726 include different types of interfaces and gateways to enable wireless and wired communications between the drone 710 and other devices. The communication unit 726 may enable wireless connectivity to a local area network (LAN), a wide area network (WAN), and/or a cellular network such as an LTE network. Besides using standard communication protocols, the communication unit 726 may have dedicated frequency bandwidth used to communicate with the ground control unit 730. In cases of the communication unit 726 having a capability to communicate with a long-range cellular network, the drone 710 may be directed controlled through the network 740 by a computing device 750. The drone 710 may transmit data captured by the scanning devices 712 in real time through the communication units 726 to the network 740. The communication unit 726 may also have a wired interface such as a universal serial bus (USB) that allow users to download data stored in the memory 724 when the drone 710 returns to the ground.

The foregoing description of the embodiments of the invention has been presented for the purpose of illustration: it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer-readable medium may be a non-transitory computer readable storage medium.

Embodiments of the invention may also relate to an apparatus for performing the operations herein. This apparatus ma) be specially constructed for the required purposes, and/or it may comprise a general-purpose computing device selectively activated or reconfigured by a computer program stored in the computer. Such a computer program may be stored in a tangible, non-transitory computer readable storage medium or any type of media suitable for storing electronic instructions, and coupled to a computer system bus.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving point cloud data of an environment, the point cloud data describing the environment with points, each point comprising a scanned time and scanned coordinates;
selecting, from the point cloud data, a subset of points;
determining a motion parameter of an object associated with the subset of points, determining the motion parameter comprising:
projecting a projected motion parameter,
determining, for the points in the subset, moved coordinates that are commonly to a common reference time, the moved coordinates for a particular point in the subset derived from a projected movement under the projected motion parameter in duration between the common reference time and the scanned time corresponding to the particular point,
forming a reconstructed surface corresponding to the common reference time, the reconstructed surface comprising moved points that are generated from the moved coordinates,
evaluating a surface quality of the reconstructed surface, and
responsive to the surface quality exceeding a threshold quality, determining that the projected motion parameter is the motion parameter;
determining, based on the motion parameter, that the object is moving;
removing the subset of points associated with the object from the point cloud data; and
constructing a map based on the point cloud data.

2. The method of claim 1, wherein forming a reconstructed surface and evaluating the surface quality of the reconstructed surface are iteratively repeated with different projected motion parameters until one of the different projected motion parameter results in the surface quality exceeding the threshold quality.

3. The method of claim 1, wherein determining the motion parameter is performed through a machine learning model.

4. The method of claim 1, wherein evaluating the surface quality of the reconstructed surface comprises evaluating a thickness of the reconstructed surface.

5. The method of claim 1, wherein evaluating the surface quality of the reconstructed surface comprises evaluating an entropy of the reconstructed surface.

6. The method of claim 1, wherein each point of the point cloud data further comprises a color value.

7. The method of claim 6, wherein the map constructed comprises a plurality of spatial points, each spatial point is associated with coordinates and a color value.

8. The method of claim 1, wherein the projected motion parameter is a projected velocity of the object.

9. The method of claim 1, further comprising labelling the constructed map with metadata.

10. A non-transitory computer readable storage medium configured to store program code, the program code comprising instructions that, when executed by one or more processors, cause the one or more processors to:
receive point cloud data of an environment, the point cloud data describing the environment with points, each point comprising a scanned time and scanned coordinates;
select, from the point cloud data, a subset of points;
determine a motion parameter of an object associated with the subset of points, determine the motion parameter comprising:
project a projected motion parameter,
determine, for the points in the subset, moved coordinates that are commonly to a common reference time, the moved coordinates for a particular point in the subset derived from a projected movement under the projected motion parameter in duration between the common reference time and the scanned time corresponding to the particular point,
form a reconstructed surface corresponding to the common reference time, the reconstructed surface comprising moved points that are generated from the moved coordinates,
evaluate a surface quality of the reconstructed surface, and
responsive to the surface quality exceeding a threshold quality, determine that the projected motion parameter is the motion parameter;
determine, based on the motion parameter, that the object is moving;
remove the subset of points associated with the object from the point cloud data; and
construct a map based on the point cloud data.

11. The non-transitory computer readable storage medium of claim 10, wherein forming a reconstructed surface and evaluating the surface quality of the reconstructed surface are iteratively repeated with different projected motion parameters until one of the different projected motion parameter results in the surface quality exceeding the threshold quality.

12. The non-transitory computer readable storage medium of claim 10, wherein determine the motion parameter is performed through a machine learning model.

13. The non-transitory computer readable storage medium of claim 10, wherein evaluate the surface quality of the reconstructed surface comprises evaluate a thickness of the reconstructed surface.

14. The non-transitory computer readable storage medium of claim 10, wherein evaluate the surface quality of the reconstructed surface comprises evaluate an entropy of the reconstructed surface.

15. The non-transitory computer readable storage medium of claim 10, wherein each point of the point cloud data further comprises a color value.

16. The non-transitory computer readable storage medium of claim 15, wherein the map constructed comprises a plurality of spatial points, each spatial point is associated with coordinates and a color value.

17. The non-transitory computer readable storage medium of claim 10, wherein the projected motion parameter is a projected velocity of the object.

18. The non-transitory computer readable storage medium of claim 10, wherein the instructions further cause the one or more processor to label the constructed map with metadata.

* * * * *